Nov. 3, 1953 W. RAYMOR 2,657,913
SUPPLEMENTARY FEED DEVICE FOR INTERNAL-COMBUSTION ENGINES
Filed Aug. 6, 1948 2 Sheets-Sheet 1
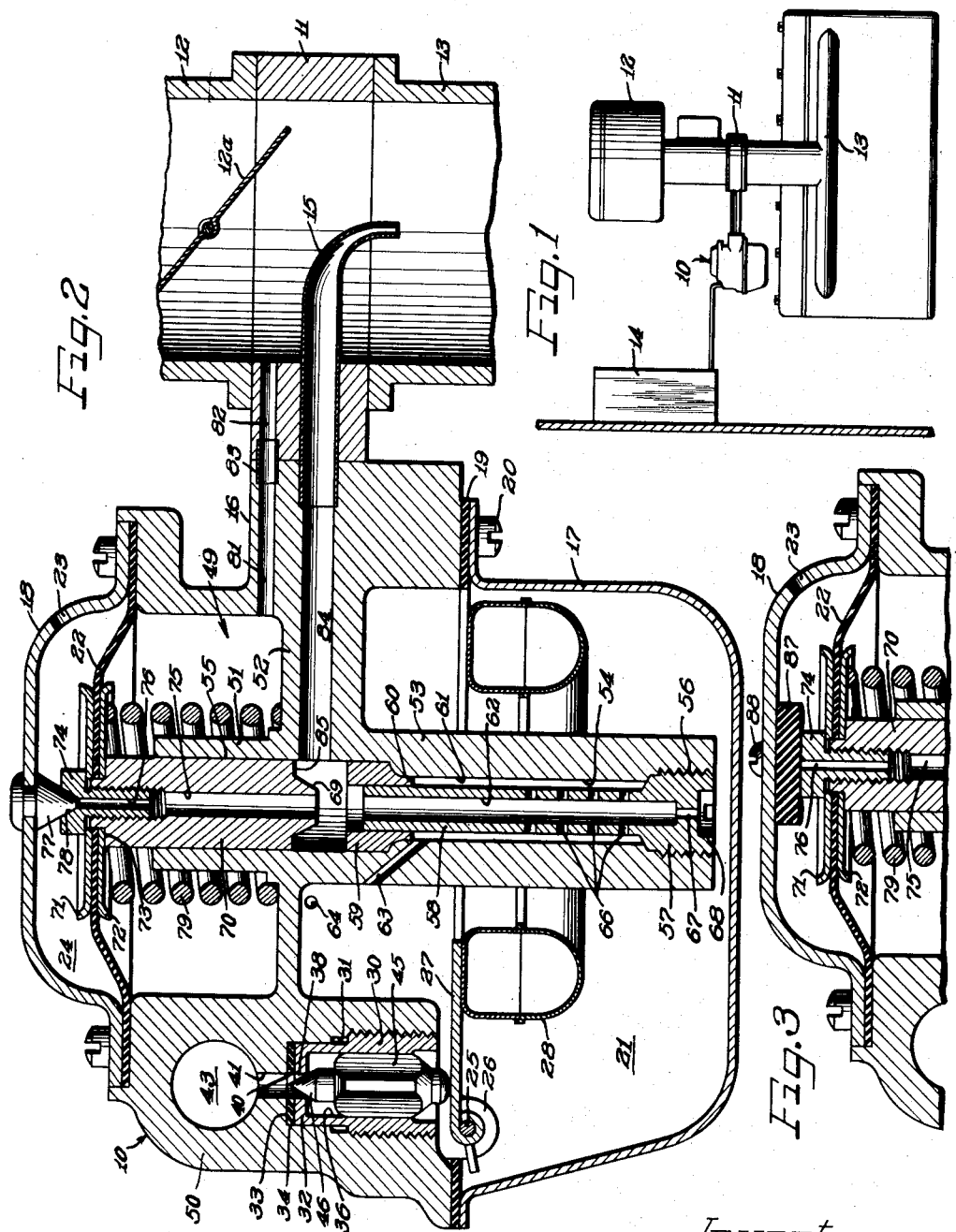
Inventor
Willard Raymor
By The Firm of Charles Hill Attys Nov. 3, 1953 — W. RAYMOR — 2,657,913
SUPPLEMENTARY FEED DEVICE FOR INTERNAL-COMBUSTION ENGINES
Filed Aug. 6, 1948 — 2 Sheets-Sheet 2
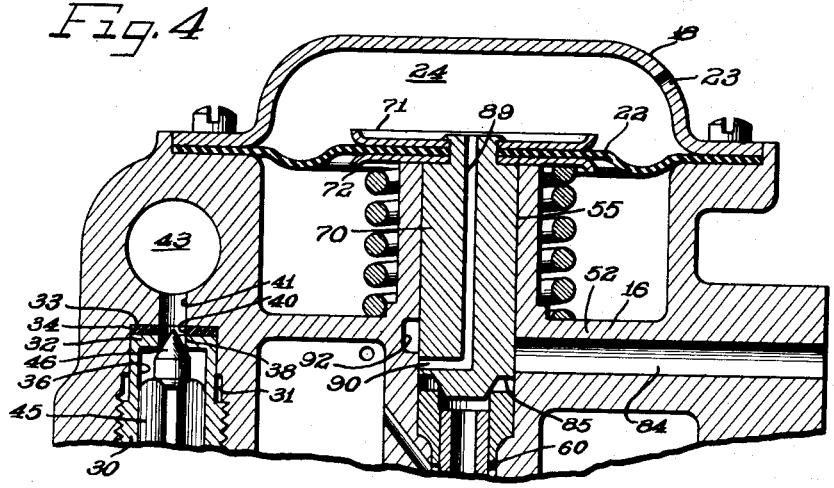
Fig. 4
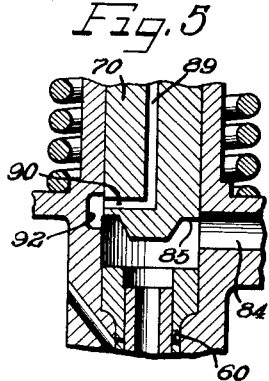
Fig. 5
Fig. 6
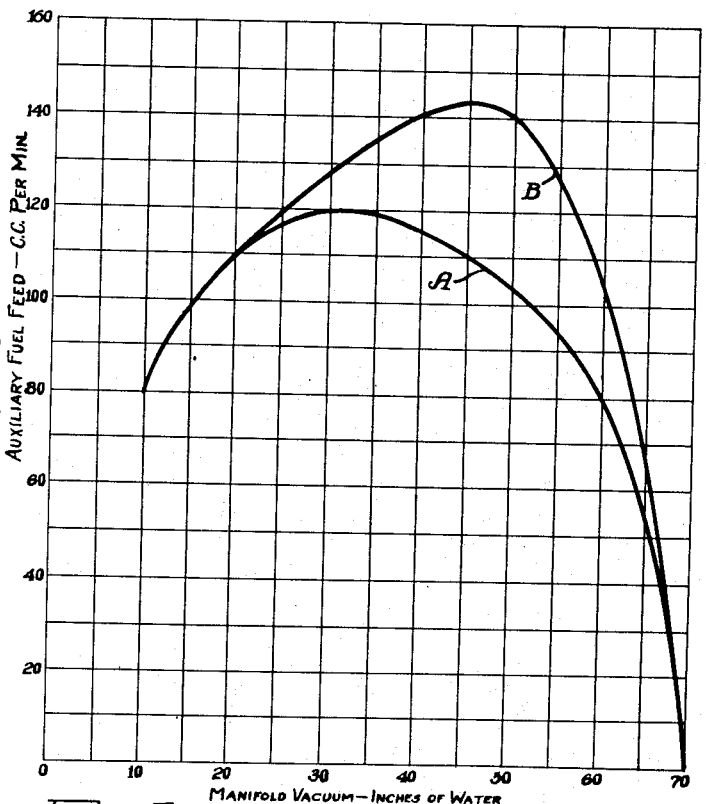
Fig. 7
Inventor
Willard Raymor Patented Nov. 3, 1953

2,657,913

UNITED STATES PATENT OFFICE 2,657,913

SUPPLEMENTARY FEED DEVICE FOR INTERNAL-COMBUSTION ENGINES

Willard Raymor, Cleveland, Ohio, assignor to Thompson Products, Inc., Cleveland, Ohio, a corporation of Ohio Application August 6, 1948, Serial No. 42,915

8 Claims. (Cl. 261—18)

This invention relates to devices for feeding controlled amounts of coolant or anti-knock fluids to the fuel intake of an internal combustion engine. Specifically, this invention deals with supplementary air vent means for varying the richness or concentration of the anti-knock fluid in accordance with varying engine conditions.

Feeding of auxiliary liquids, such as water, alcohol or the like, to internal combustion engines for the purpose of suppressing engine detonation and for increasing power delivery of the engine is known. It is also known that engine detonation varies with the quality of the main fuel being burned and usually increases with engine speed, and then decreases and disappears.

The peak knock point of each engine will vary somewhat and if expensive auxiliary liquids, like alcohol, are to be used for suppressing engine detonations, it is most economical to feed these liquids only when actually needed and then only in amounts that are just sufficient to carry out their function. If the detonation suppressing liquid has a fuel value, like alcohol for example, the jet or spray with which it is introduced into the fuel intake of the engine should contain sufficient air to insure thorough combustion and utilization of the fuel value.

Since suction or vacuum in the engine intake manifold varies inversely with the throttle opening, this vacuum has been used as an actuator for opening and closing a feed valve for the auxiliary liquid. However, the heretofore known auxiliary fuel feed devices merely closed during periods of high manifold vacuum, as when the engine was idling, and opened to feed a constant ratio of relatively rich auxiliary fuel-air mix or fuel alone when the engine was operating under part or full throttle conditions.

Since auxiliary anti-detonant fuel is expensive, it is economically desirable to feed a rich auxiliary fuel-air mix to the engine only during high load, low vacuum operation, to feed a leaner auxiliary fuel-air mix during medium load speed, medium vacuum operation, and to completely stop the auxiliary fuel feed during low load, high vacuum conditions.

The supplementary feed device of the present invention is equipped with an auxiliary air vent which is closed during periods of low vacuum when a rich auxiliary fuel-air mix or auxiliary fuel alone is needed by the engine but is progressively opened as intake manifold vacuum increases, thereby leaning out the fuel-air ratio.

According to the teaching of the present invention, there is provided a supplementary fuel feed device having a casing with a float chamber, affording a supply of auxiliary fuel to an upright tube at a level below the seat of a fuel feed valve which controls the passage of auxiliary fuel from the tube to a jet or nozzle communicating with the intake manifold of the engine. The head or seating portion of the feed valve is on the end of a slidable cylindrical block in alignment with the valve seat for closing thereover in response to movements of a diaphragm in a pressure chamber which is in communication with the intake manifold of the engine. An air passage is drilled through the cylindrical block emerging at one end at the center of the head portion of the auxiliary fuel feed valve and at the other end into a chamber vented to the atmosphere. At the latter end, a valve is provided having one portion fixed to the stationary casing and the other portion disposed in the cylindrical block about the end of the air passage therethrough so that, as the diaphragm moves the cylindrical block for closing the auxiliary fuel feed valve, it will progressively open the air passage permitting auxiliary air to be drawn into the jet or nozzle to dilute the auxiliary fuel being drawn therethrough. Since only a certain volume of fluid can be drawn through the nozzle for any given degree of vacuum in the intake manifold of the engine and since a portion of it must now be auxiliary air, a decrease in the amount of auxiliary fuel will take place as the auxiliary air passage is opened to supply a leaner mixture and a decreased volume as the vacuum increases.

However, when the auxiliary fuel feed valve closes completely, communication of the auxiliary air passage with the nozzle will also be cut off. Thus, this auxiliary air passage will not interfere with the normal operations of the carburetor when auxiliary fuel is not being fed to the engine. Likewise the auxiliary air passage will not function to derich the auxiliary fuel-air mixture fed to the engine under conditions of engine operation in which detonation is most likely to occur.

It is then an object of the present invention to provide an auxiliary air passage effective to dilute the concentration of auxiliary fuel being drawn into the carburetor or manifold of an engine in accordance with varying conditions of operation.

A further object of the invention is to provide an auxilary fuel feed device for internal combustion engines which supplies a rich fuel-air mix to the engine during periods of engine operation where the intake manifold pressure is relatively high, supplies a lean, fuel-air mix during periods of lower manifold pressure operation, and then cuts off the auxiliary fuel and air feed as the manifold pressure decreases to ranges wherein detonation will not occur.

Another object of this invention is to provide a valve member having a central passage therethrough with valve seats at either end, such valve member being movable to progressively open one valve and to close the other.

A further object of this invention is to provide a valve member having a central passage and a valve head at one end controlling a fuel passageway and a valve seat at the other end controlling an air passageway whereby movement of said member in one direction within a predetermined range closes said air passageway, while continued movement beyond said range closes both passageways.

A still further object of this invention is to provide a supplementary feed device having a fuel feed passageway and an auxiliary air passageway opening into a jet tube leading to the intake manifold of the engine, and a valve operable to decrease the effective size of the opening of the common passageway into the jet tube for decreasing the feed of auxiliary air in proportion to the amount of decrease in the quantity of auxiliary fuel supplied to the intake manifold.

A still further object of this invention is to equip a supplementary fuel feed device with a vent tube which provides for temporary enrichment of fuel feed to the carburetor at the time of starting of the engine followed by a decrease in the rate of enrichment of fuel feed in proportion to increase in vacuum in the intake manifold.

Other and further objects of the present invention will be apparent to those skilled in the art from the following detail description of the annexed sheets of drawings which, by way of preferred example only, illustrate embodiments of the invention, together with a chart of operation of the device of this invention.

On the drawings:

Figure 1 is a more or less a diagrammatic showing of an internal combustion engine equipped with the supplementary fuel feed device of the present invention.

Figure 2 is a vertical cross sectional view of a supplementary feed device according to this invention mounted on an engine intake manifold.

Figure 3 is a fragmentary vertical cross-sectional view of a modified form of auxiliary air intake valve as used on the supplementary feed device of this invention.

Figure 4 is a fragmentary vertical cross-sectional view of a modified form of the feed device of the present invention.

Figure 5 is a fragmentary vertical cross-sectional view of the device of Figure 4 showing the auxiliary air valve in an open position.

Figure 6 is a fragmentary vertical cross-sectional view of the device of Figure 4 showing the air valve in a closed position.

Figure 7 is a chart of a fuel feed curve illustrating the feed characteristics obtainable with the device of the present invention.

As shown on the drawings:

In Figure 1 the reference numeral 10 designates generally a supplementary feed device according to this invention mounted on a flange or mounting block 11 which is positioned between the outlet of a carburetor 12 and the inlet of an engine intake manifold 13. As is customary, fuel feed from the carburetor is controlled by a throttle valve 12a. A tank 14 supplies the feed device with fuel. The block 11 carries a nozzle 15, Figure 2, with an outlet facing downstream in the block 11. The tube as shown projects laterally through the block 11.

The device 10 includes a casing 16, a cup-shaped bottom closure plate 17 and a cover plate 18. The bottom plate 17 is held in sealed engagement with the casing 16, with a gasket 19 of resilient material held therebetween by means of a plurality of cap screws 20.

The bottom plate 17 defines a float chamber 21 while the cover plate 18, in connection with a diaphragm 22, secured between the casing 16 and the cover plate 18, defines an air chamber 24 vented to the atmosphere by an aperture 23 in the cover plate 18.

A pin 25 is journalled in a bracket 26 depending from the casing 16 and pivotally supports an arm 27 carrying an annular float 28. A tubular valve housing 30 is threaded into an opening 31 in the casing 16 and has an end portion 32 bottomed against a shoulder 33 of the opening 31 with a gasket 34 therebetween. The tubular housing 30 has a central opening 36 with a restricted orifice 38 at one end thereof. Passageways 40 and 41 in the gasket 34 and the housing 16 respectively are aligned with the restricted orifice 38 of the housing 30 affording communication between the chamber 36 and a tubular passage 43 connected to the auxiliary fuel tank 14.

A valve 45 is slidably disposed in the chamber 36 and has a conical seating surface 46 movable into the restricted orifice 38 and coacting with the edges thereof to control flow of fluid through the housing into float chamber 21. The arm 27 of the float assembly acts on the valve 45 to move the seating surface 46 into the orifice 38 to stop flow of fluid into the chamber 21 when the chamber is filled.

The casing 16 has an outer ring portion 50 and an upper central boss portion 51 connected by a web-like member 52 to define a well 49. A lower boss portion 53 depending from the web member 52 extends downwardly into the float chamber 21 and has a central bore or passage 54 in communication with a central passage 55 of substantially larger diameter in the upper boss 51. The lower boss 53 terminates in a threaded portion 56 arranged to receive the threaded end 57 of a tubular member 58 which is centrally disposed in the passageway 54. A spacer ring 59 is disposed about the end of the tubular member 58 at the upper end thereof where the passage 54 merges with the larger passage 55 of the upper boss 51. It will be seen that the lower end of the passage 55 forms a discharge chamber for fluid leaving the passage 54. An annular shoulder 60 extends downwardly from the spacer ring 59 between the tubular member 58 and the outer wall of the central passage 54 in the lower boss 53 providing an annular passage 61 which is in communication with that portion of the float chamber above the shut-off position of the float by means of a slanted passageway 63. This upper portion of the float chamber is vented to atmosphere through an opening 64 in the casing 16.

To establish communication between the annular passage 61 and the central passageway 62 of the tubular member 58 there is provided a series of radially extending passages 66 in the tubular member 58. The passageway at the center of the tubular member 58 is also in communication with the liquid in the float chamber through a fixed jet passageway 67 and an enlarged passageway 68 in the threaded end 57 of the tube.

Liquid in the float chamber will of course pass upwardly through the passageways 68 and 67 into the central portion of the tubular member 58 and stand at a height therein corresponding to the height of the liquid in the float chamber.

As is clearly seen in Figure 2, the upper end of the tubular member 58 is spaced below the upper end of the spacer ring 59. The upper peripheral edges of the central opening through the spacer ring 59 provide a seat for a substantially frusto-conical metering valve seating member 69 integrally formed on the lower end of a cylindrical block 70 which is slidably disposed in the central passage 55 of the upper boss portion 51 of the casing 16.

The central portion of the diaphragm 22 is held between washer members 71 and 72 on a shoulder 73 by means of a bolt 74 which is threaded into a central passageway 75 in the cylindrical block 70. Thus, flexing movement of a diaphragm 22 will cause the cylindrical block 70 to slide up and down in the boss 51 and move the frusto-conical valve portion 69 toward or away from the valve seating edges of the spacer ring 59.

The bolt 74 also has a central passageway 76 and is provided at one end with a valve seat 78 receiving the frusto-conical valve 77 secured in the cover member 18.

A coiled spring 79 disposed between the web portion 52 of the casing 16 and the washer 72 tends to move the washer and the associated diaphragm 22 away from the web 52 causing the cylindrical block 70 to slide upwardly in the passage 55 and move the valve portion 69 away from its seat.

Downward movement of the diaphragm 22 and the associated cylindrical block 60 is effected by suction in the intake manifold which communicates with the chamber below the diaphragm 22 by means of aligned passages 81 and 82 in the casing 16 and in the mounting block 11, respectively, which passageways are connected by a tubular grommet 83. The coil spring 79 is so selected that it will be strong enough to overcome the pull on the diaphragm 22 exerted by low vacuum in the intake manifold but will permit the diaphragm to be progressively pulled down as the vacuum in the intake manifold increases until at high manifold vacuum the valve 69 is fully bottomed on its seat.

A passage 84 extends through the casing 16 from the portion of the bore 55 just above the ring 59 to the nozzle 15.

In service, the supplementary fuel device of this invention operates as follows. The device 10 receives supplementary fuel such as a mixture of alcohol and water through the tube 43. The float 28 controls the inlet valve 45 to admit the fuel to the float chamber 21. The slanted passage 63 connecting the float chamber 21 with the annular passage 61 and the vent 64 from the float chamber 21 to the atmosphere maintain the float chamber under atmospheric pressure. Supplementary fuel under atmospheric pressure in the float chamber 21 is metered to the nozzle 15 by the slanted surface of the metering valve head 69.

The size of the metering valve orifice is controlled by the degree of vacuum in the spring chamber and by the setting of the spring 79. When the engine is stopped and no vacuum exists in the spring chamber, the spring 79 opens the metering valve and fuel in the float chamber 21 flows by gravity through the bores 68 and 67 to rise in the tube 58 to the same level as exists in the float chamber. When the engine is started, vacuum in the intake manifold 13 will draw a slug of supplementary fuel standing in the tube 58 into the manifold through the nozzle 15 thereby feeding an enriched slug of supplementary fuel to the engine immediately upon starting the engine.

If the engine is allowed to idle, vacuum will be built up in the intake manifold 13 and will evacuate the spring chamber to cause the diaphragm 22 to move downwardly and force the valve head 69 onto its seat. As the load on the engine is increased, the vacuum in the intake manifold 13 is decreased and the spring 79 begins to overcome the pull of vacuum on the diaphragm 22 and to move the diaphragm upwardly to unseat the valve 69. When the engine is running under high loads the valve 65 will be completely off its seat, as shown in Figure 2 and auxiliary fuel mixed with air sucked in through the passage 63 will be delivered in the form of a spray through the nozzle into the intake manifold. Under open throttle conditions of engine operation, relatively high manifold pressures or low vacuums will exist in the intake manifold 13 and as a result, the spring 79 will be effective to hold the diaphragm in the upper position indicated in Figure 2. Now, as the load on the engine is eased and the throttle moved toward closed position, the vacuum in the intake manifold will increase and the spring chamber 49 will be progressively evacuated to cause an increasing pull to be exerted on the diaphragm 22. Such pull on the diaphragm 22 will overcome the resistance of the spring 79 and cause the diaphragm to move downwardly with the valve head 69 moving toward the valve seat. It is to be particularly noted that, as the cylindrical block 70 moves downwardly, the valve seat 78 at the upper end of the bolt 74 is moved away from the valve head 77 thus causing air to be admitted into the air passage 76 to pass downwardly therein and mix with the auxiliary fuel which is being drawn from the tube 58. Thus during the period of engine operation between high loads when concentrated auxiliary fuel is required and idling speeds when no auxiliary fuel is required, the auxiliary fuel is diluted by the auxiliary air entering through the passage 73.

It is further to be noted that as soon as a shoulder 85 at the lower end of the cylindrical block 70 passes the upper end of the passage 84, the quantity of the diluted auxiliary fuel mixture will begin to be metered since the opening to the passage 84 will begin to be closed. Thus, the device of this invention not only provides means for diluting the auxiliary fuel at engine loads where concentrated fuel is not required but also provides means for metering the quantity of the auxiliary fuel as the vacuum in the intake manifold increases.

When the engine is operating under idling conditions, the vacuum in the intake manifold will be high enough to cause the diaphragm 22 to move downwardly for forcing the valve head 69 on its seat. At this point, not only is the central passage 62 of the tube 58 closed but also the passage 75 is cut off from communication with the passage 84 which leads to the nozzle 15. Therefore, at idling speed or at conditions of high vacuum where auxiliary fuel is not needed, the device of this invention completely shuts off the source of auxiliary fuel and also, in order to prevent interference with the operation of the carburetor, it also cuts off the auxiliary air passageway.

In Figure 3 is shown a modified form of the auxiliary air valve member arranged to be used with the device of this invention. In this modification a pad 87 is secured by a cap screw 88 to the cover member 18. Thus, the passageway 76 in the bolt 74 which communicates with the passageway 75 will be closed when the diaphragm 22 forces the bolt 74 against the pad 87. The pad 87 is preferably made of a gasket material or other resiliently deformable material, which will sealingly receive the head of the bolt 74.

In Figures 4, 5 and 6 another modification of the auxiliary air passageway of the present invention is illustrated. In this modification cylindrical block 70 has a central air passageway 89 which extends from the top of the block 70, as shown in Figure 4, to a point adjacent the lower end of the block where it communicates with a radial passage 90 extending laterally in the block 70. A pocket 92 is recessed in the web portion 52 of the casing and is in communication with the bore 55 of the upper boss 51. This pocket 92 is located at a point above the position which the shoulder 85 of the cylindrical block 70 assumes in its lowermost position shown in Figure 4 and substantially below the position which this shoulder 85 assumes in its uppermost position as shown in Figure 6. Thus, with a low vacuum condition in the intake manifold and the diaphragm 22 in its uppermost position, the passage 90 will be sealed by the wall of the bore 55 as shown in Figure 6. As the vacuum in the intake manifold increases and the diaphragm 22 moves downwardly to cause the cylindrical block 70 to slide downwardly in the boss 51, the passage 90 will become aligned with the pocket 92, as shown in Figure 5, whereby auxiliary air entering the air passage 89 from the vented chamber 24 will pass around the lower end of the cylindrical block 70 and into the chamber therebelow for subsequent passage into the passage 84 which leads to a nozzle such as the nozzle 15. Thus, in this position the auxiliary fuel entering the passage 84 will be diluted by the entrance of auxiliary air.

As the vacuum in the intake manifold is further increased, the diaphragm will be pulled further down and the passage 90 will pass below the pocket 92 into registry with the blank wall of the bore 55 to thus cut off the source of auxiliary air. Thus, the arrangement shown in Figures 4, 5 and 6 provides a valve means for supplying auxiliary air for diluting the auxiliary fuel which is being fed to the engine during that period of operation between high vacuum and low vacuum in the intake manifold and provides valve means for shutting off both the auxiliary fuel feed and the auxiliary air feed when high vacuum exists in the intake manifold.

In Figure 7, there is illustrated in graph form the amount of fuel saving for various conditions of manifold vacuum when the auxiliary air passage of this invention is used to dilute the concentration of auxiliary fuel. Curve A represents the amount of fuel feed when the auxiliary air means of the present invention is used. Curve B shows the amount of auxiliary fuel being used when no auxiliary air feed is employed. The two curves merge in the low and high vacuum ranges. Thus, it is seen that as much as thirty cubic centimeters per minute of fuel may be saved by using the auxiliary air passage of this invention without decreasing the auxiliary fuel feed in the low vacuum ranges where it is needed.

From the foregoing description it is seen that there is provided in this invention an effective means for economizing on the use of anti-detonate fluid during periods of operation when concentrated fluid is not needed.

I have shown a practical and efficient embodiment of the various features of my invention but I do not desire to be limited to the exact arrangement and operation shown and described, since changes and modifications may be made without departing from the scope of the invention as defined in the appended claims.

I claim as my invention:

1. An auxiliary fluid feed device for the fuel intake of an internal combustion engine comprising a main housing body having a mounting flange on one side thereof, a support unit arranged to be inserted between the carburetor and the intake manifold of an engine and having a laterally projecting mounting boss, means connecting the mounting flange of said housing to said boss, said main housing having a web in the top thereof with an upstanding central boss and a boss depending from the bottom face thereof, aligned top and bottom bores extending through said bosses, said top bore having an enlarged diameter and providing a discharge chamber at the upper end of said bottom bore, an orifice at the upper end of said bottom bore at the entrance to said chamber, a block slidable in said top bore, a valve head on the lower end of said block for controlling flow of fluid through said orifice, a cup-shaped closure member secured to the bottom face of the housing body and defining a float chamber, an upstanding tubular fitting projecting into said bottom bore of said main housing and in communication with the float chamber, means for supplying fluid to said float chamber, a passage in said housing connecting said discharge chamber to the engine intake manifold, an air chamber in said housing vented to atmosphere, said slidable block having a valve-controlled central bore in communication with said air chamber, and means responsive to the vacuum in the intake manifold of the engine for actuating said block to move the valve head at the lower end thereof toward said orifice to reduce flow of auxiliary fluid to the engine and for opening said valve-controlled bore to permit increasing air flow to said discharge chamber, air flow through said valve-controlled bore being blocked when said valve head completely closes said orifice.

2. An antiknock fluid feed device for the intake of an internal combustion engine comprising a housing defining a float chamber, a float controlled inlet in said housing for supplying antidetonant fluid to the float chamber, said housing having a fuel passageway extending upwardly from the lower portion of the float chamber and vented to atmosphere near its upper end, an orifice at the upper end of said fuel passageway, an enlarged bore in said housing defining a discharge chamber adjacent the upper end of said passageway, an air chamber in said housing vented to atmosphere, a block slidable in said bore having a valve head at one end movable over said fuel passageway for stopping flow therethrough and a valve-controlled central bore in communication with said air chamber, a passage connecting said discharge chamber to the engine intake manifold and means responsive to the vacuum in the intake manifold of the engine for actuating said valve whereby antiknock fluid is fed to the engine in accordance with the engine throttle demand, said valve being effective to open said valve controlled central bore to permit air to flow to said discharge chamber as said valve moves to close said fuel passageway.

3. A device for metering auxiliary fluid to the main fuel intake of an engine comprising a housing having upper and lower substantially central bosses, aligned top and bottom bores extending through said bosses, said top bore having an enlarged diameter and providing a discharge chamber at the upper end of said bottom bore, said housing having a discharge passage in communication at one end with the intake manifold of the engine and at the other end in communication with said discharge chamber and disposed substantially normal to the axis of said enlarged bore, a block slidable in said enlarged bore and having a valve head movable through said discharge chamber for seating over the upper end of said bottom bore, said block also having a central passageway in communication with the discharge chamber through the center of said valve head, air valve means at the opposite end of said passageway for regulating the flow of air therethrough, said block being effective to open said air valve means as said valve head moves across said discharge chamber to close said upper end of said bottom bore, and to progressively close the opening to said discharge passage, whereby auxiliary air is introduced to dilute said fluid mixture as it passes through said discharge chamber until said valve head seats on said upper end of said bottom bore.

4. A device for feeding fluid to the fuel intake of an internal combustion engine, comprising a housing defining a float chamber and having upper and lower substantially central bosses, aligned top and bottom bores extending through said bosses, said top bore providing a discharge chamber at the upper end of said bottom bore, said housing having a discharge passageway in communication at one end with the intake manifold of the engine and at the other end in communication with said discharge chamber, a cover member on said housing defining an air chamber vented to atmosphere, a block slidable in said top bore having a valve head at one end in alignment with the upper end of said bottom bore for seating engagement thereover, said block also having a central bore in communication at one end with said discharge chamber through the center of said valve head, and in communication at the other end with said air chamber, a tapered valve head secured to the inner side of said housing cover in alignment with the central bore of said block for seating therein to stop flow of air therethrough, and means responsive to the vacuum in the intake manifold of the engine to actuate said block toward or away from seating contact with the upper end of said bottom bore.

5. A device for feeding fluid to the fuel intake of an internal combustion engine, comprising a housing defining a float chamber and having upper and lower substantially central bosses, aligned top and bottom bores extending through said bosses, said top bore providing a discharge chamber at the upper end of said bottom bore, said housing having a discharge passage in communication at one end with the intake manifold of the engine and at the other end in communication with said discharge chamber, a cover member on said housing defining an air chamber vented to atmosphere, a block slidable in said top bore having a valve head at one end in alignment with the upper end of said bottom bore for seating engagement thereover, said block also having a central bore in communication at one end with said discharge chamber through the center of said valve head, and in communication at the other end with said air chamber, a plug threaded into the upper end of said central bore having a passage in communication therewith, a pad secured to the inner side of said cover and arranged to seat over the end of said plug to stop flow of air therethrough, and means responsive to the vacuum in the intake manifold of the engine to actuate said block for controlling flow of air and fluid to said discharge chamber.

6. A device for feeding fluid to the fuel intake of an internal combustion engine, comprising a housing defining a float chamber and having upper and lower substantially central bosses, aligned top and bottom bores extending through said bosses, said top bore providing a discharge chamber at the upper end of said bottom bore, said housing having a discharge passageway in communication at one end with the intake manifold of the engine and at the other end in communication with said discharge chamber, a cover member on said housing defining an air chamber vented to atmosphere, a recess in the wall of said top bore substantially opposite said discharge passageway and in communication with said discharge chamber, a block slidable in said top bore having a valve head at the lower end movable over the upper end of said bottom bore for metering the flow of fluid therethrough, said block also having a longitudinal passage in communication at one end with said air chamber and at the other end with a radial passage leading to the outer wall of said block for alignment with said recess in the wall of said top bore, communication between said air chamber and said discharge chamber being established when the block is moved downwardly so that the radial passage is aligned with said recess further downward movement of said block being effective to cut off the communication of said recess with said discharge chamber, and means responsive to the vacuum in the intake manifold of the engine to actuate said block, whereby downward movement of said block will cause progressive restriction of the flow of fluid from said bottom bore and will, for a period of time dependent upon the dimensions of said recess, cause auxiliary air to flow into said discharge chamber to dilute said fluid.

7. For use with an internal combustion engine having an intake manifold, a supplementary fuel feed device comprising: a housing having a supplementary fuel and air mixing chamber and a passage extending from said chamber for communication with said intake manifold, means defining a supplementary fuel chamber, means communicating with said supplementary fuel chamber and defining an orifice opening into said mixing chamber, means defining an air chamber, a slidable block between said air chamber and said mixing chamber and having an air flow passage therethrough, means urging said block to a position blocking air flow from said air chamber through said air passage to said mixing chamber, and means responsive to manifold vacuum for moving said block from said position toward said orifice to permit increase in air flow from said air chamber through said passage to said mixing chamber and to reduce supplementary fuel flow through said orifice to said mixing chamber, a predetermined manifold vacuum being effective to move said block over said orifice and prevent supplementary fuel flow and also to prevent air flow through said air passage to said mixing chamber.

8. For use with an internal combustion engine having an intake manifold, a supplementary fuel feed device comprising: a housing having a supplementary fuel and air mixing chamber and a passage extending from said chamber for communication with said intake manifold, means defining a supplementary fuel chamber, means communicating with said supplementary fuel chamber and defining an orifice opening into said mixing chamber, a slidable block adjacent said mixing chamber and having an air flow passage therethrough, a valve structure cooperating with said air flow passage, means urging said block to a position with respect to said valve structure as to block air flow through said air passage to said mixing chamber, and means responsive to manifold vacuum for moving said block from said position toward said orifice to reduce supplementary fuel flow through said orifice to said mixing chamber, a predetermined manifold vacuum being effective to move said block over said orifice and prevent supplementary fuel flow and also to prevent air flow through said air passage to said mixing chamber.

WILLARD RAYMOR.

References Cited in the file of this patent

UNITED STATES PATENTS

| Number | Name | Date |
|---|---|---|
| 1,889,584 | Zimmerer | Nov. 29, 1932 |
| 1,990,702 | Leibing | Feb. 12, 1935 |
| 2,216,677 | Schuttler | Oct. 1, 1940 |
| 2,319,773 | Ericson | May 18, 1943 |
| 2,321,211 | Johnson | June 8, 1943 |
| 2,418,440 | White et al. | Apr. 1, 1947 |
| 2,441,301 | Waag et al. | May 11, 1948 |
| 2,477,481 | Ericson | July 26, 1949 |

FOREIGN PATENTS

| Number | Country | Date |
|---|---|---|
| 524,419 | Great Britain | Aug. 6, 1940 |